United States Patent
Grass et al.

(10) Patent No.: US 6,230,504 B1
(45) Date of Patent: May 15, 2001

(54) AIR-CONDITIONING CONTROL SYSTEM IN A MOTOR VEHICLE

(75) Inventors: Thomas Grass, Urbach; Franz Kosik, Ostfildern, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/486,078

(22) PCT Filed: Aug. 6, 2000

(86) PCT No.: PCT/EP98/04897

§ 371 Date: Feb. 22, 2000

§ 102(e) Date: Feb. 22, 2000

(87) PCT Pub. No.: WO99/08890

PCT Pub. Date: Feb. 25, 1999

(30) Foreign Application Priority Data

Aug. 19, 1997 (DE) .............................. 197 35 855

(51) Int. Cl.[7] ..................................................... B60H 1/00
(52) U.S. Cl. .................... 62/133; 62/323.4; 123/198 R
(58) Field of Search ................... 62/133, 323.1, 62/323.4, 228.1, 230, 226, 227, 157, 158, 231, 243, 244

(56) References Cited

U.S. PATENT DOCUMENTS

| | | | |
|---|---|---|---|
| 4,488,410 | * 12/1984 | Seiderman | 62/323.4 X |
| 4,688,530 | * 8/1987 | Nishikawa et al. | 123/198 R X |
| 5,347,824 | * 9/1994 | Kato et al. | 62/133 |
| 5,694,781 | * 12/1997 | Peterson | 62/133 |

FOREIGN PATENT DOCUMENTS

| | | |
|---|---|---|
| 43 01 591 | 7/1993 | (DE) . |
| 43 39 935 | 11/1994 | (DE) . |
| 44 26 260 | 2/1995 | (DE) . |

* cited by examiner

Primary Examiner—Harry B. Tanner
(74) Attorney, Agent, or Firm—Evenson, McKeown, Edwards & Lenahan, P.L.L.C.

(57) ABSTRACT

The invention relates to the control of an automatic clutch in the drive train of a motor vehicle having a gearbox which can be changed arbitrarily by the driver between drive positions and idle (isolation of gearbox input and gearbox output). During idling, the clutch is essentially kept disengaged in order to reduce noise (gearbox rattling), but is temporarily closed at intervals for very short periods of time, in order to reset a temperature drift of an actuator unit which operates the clutch and which assumes a self-adjusting position when the clutch is engaged. The air conditioning system is switched off temporarily when, during idling, the clutch is engaged temporarily in order to eliminate the risk of rattling noise of the gearbox due to the air conditioning system being on.

13 Claims, 1 Drawing Sheet ative clutch. The vehicle engine, especially an internal combustion engine, is or can be connected to driven wheels of the vehicle via a gearbox. The gearbox can be changed over arbitrarily by the driver between drive positions and idle (isolation of gearbox input and gearbox output) and via the clutch arranged between the engine and gearbox. An actuator unit that operates the clutch assumes a self-adjusting starting position when the clutch is engaged and assumes an operating position with (slow) temperature drift when the clutch is disengaged.

AIR-CONDITIONING CONTROL SYSTEM IN A MOTOR VEHICLE

BACKGROUND AND SUMMARY OF THE INVENTION

The invention relates to the control of an air-conditioning system in a motor vehicle, which has an automatic clutch. The vehicle engine, especially an internal combustion engine, is or can be connected to driven wheels of the vehicle via a gearbox. The gearbox can be changed over arbitrarily by the driver between drive positions and idle (isolation of gearbox input and gearbox output) and via the clutch arranged between the engine and gearbox. An actuator unit that operates the clutch assumes a self-adjusting starting position when the clutch is engaged and assumes an operating position with (slow) temperature drift when the clutch is disengaged.

Motor vehicles having automatic clutches of this type are produced on a large scale. The temperature drift of the actuator unit operated by the control can be neglected in all operating conditions in which the clutch is disengaged only for a more or less short time. This is the case when gears or drive positions of the gearbox are changed. The clutch also regularly assumes a disengaged state for only a short time when the vehicle is being driven off.

If sensors are provided in order to monitor the actual state of the clutch, it is therefore possible to dispense with complicated arrangements, which are also capable of registering the temperature drift.

If the gearbox is changed to idle, the clutch per se needs to be disengaged only during the change operation. As soon as the idling position of the gearbox has been reached, the clutch can be engaged again since, because of the isolation of the drive between the gearbox input and gearbox output which is present during idling, there is no drive connection between the engine and the driven wheels of the vehicle, and the engine can therefore continue to run in any desired way.

However, in the case of automatic clutches according to German Patent document DE 44 26 260 A1, provision is regularly made to leave the automatic clutch disengaged during idling. This is advantageous since, as a result, the risk of exciting noise in the gearbox, so-called gearbox rattling, during idling is considerably reduced.

Idling may be maintained over a relatively long time, so that the temperature drift of the actuator unit, which occurs when the clutch is disengaged, cannot be neglected. Therefore, German Patent document DE 44 26 260 A1 provides for the clutch, which is normally disengaged during idling, to be engaged temporarily for a short time at pre-defined intervals in order to reset the temperature drift.

The object of the invention is to ensure optimum control in the case of an air-conditioning system driven by the vehicle engine. According to the invention, this object is achieved by temporarily switching off the air-conditioning system driven by the engine when, during idling, the clutch is engaged temporarily in order to eliminate the temperature drift of the actuator unit.

The invention takes into account the novel finding that, during idling of the gearbox, a particular risk of exciting noise can occur if the input side of the gearbox is coupled in drive terms to the engine by engaging the clutch with the air-conditioning system switched on.

Since, during idling, the clutch is engaged for only an extremely short time in each case in order to compensate for the temperature drift, it is then virtually impossible to incur any losses in the output from the air-conditioning system as a result of switching off the air-conditioning system for a similarly short time. Instead, the comfort of the vehicle is increased considerably as a result of the reliable avoidance of noise.

Otherwise, with regard to preferred features of the invention, reference is made to the claims and to the following explanation of the drawing, using which particularly preferred embodiments of the invention will be described.

DETAILED DESCRIPTION OF THE DRAWINGS

Figure 1:
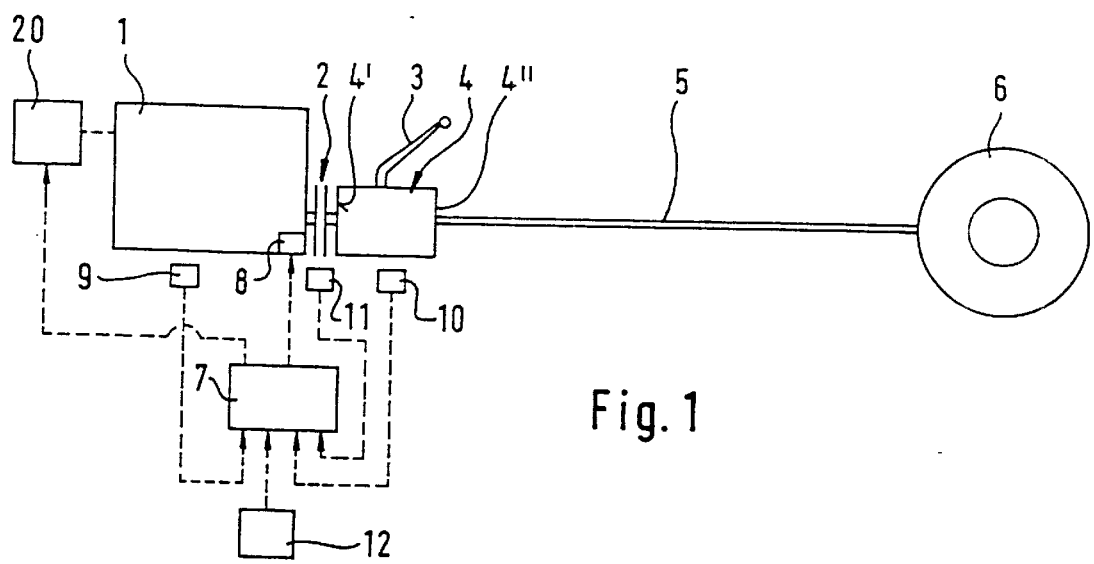
FIG. 1 shows a very schematic illustration of the drive train of a motor vehicle.

According to FIG. 1, a motor vehicle (not specifically illustrated) has an engine 1, typically an internal combustion engine with internal combustion. This engine 1 can be connected in drive terms to driven vehicle wheels 6 via a clutch 2 and a gearbox 4, which can be changed between different drive positions and idle by the driver by means of a change lever 3, and at least one drive shaft, for example a cardan shaft 5.

The clutch 2 is operated automatically by an electronic, computer-assisted control unit 7. For this purpose, the control unit 7 controls a motorized actuator unit 8 which, in turn, operates the clutch 2 and whose construction will be explained further below by way of example.

On the input side, the control unit 7 is connected to a more or less comprehensive sensor system, in order to register the parameters essential for operating the clutch 2. For example, one sensor 9 registers the rotational speed and output of the engine 1. By means of a transmitter arrangement 10, it is determined on the one hand whether a gear in the gearbox 4 is being changed and on the other hand which drive position is engaged or whether the gearbox 4 is set to idle, there being no drive connection between the gearbox input 4' and gearbox output 4". A transmitter 11 may be assigned to the actuator unit 8 and register the actual state of the latter. With regard to a simple construction of the transmitter 11 and simple signal processing by the control unit 7, the transmitter 11 does not register any parameters which have a direct or indirect relationship with any possible temperature drift of the actuator unit 8.

Otherwise, still further sensor arrangements 12 may be provided, in order to register additional parameters which, if taken into account, permit the optimization of the operation of the clutch 2 or further, not illustrated control functions of the control unit 7.

If the gear in the gearbox 4 is changed, the clutch 2 is automatically temporarily disengaged. For this purpose, the control unit 7 controls the actuator unit 8 in an appropriate way. When the vehicle begins to move, the clutch 2 is increasingly engaged as the rotational speed and output of the engine 1 increase.

If the gearbox 4 is changed to idle, a special mode of operation for the clutch 2 is provided, as will be explained further below.

Since a noticeable temperature drift on the actuator unit 8 can occur in this mode of operation, the actuator unit 8 will be explained first by way of example, using FIG. 2.

The actuator unit 8 comprises an actuating motor 13, which is operated by the control unit 7 and is generally an electric actuating motor, which has a drive connection to the piston of a piston/cylinder unit 14 arranged as a hydraulic transmitter. If the piston of this unit 14 assumes the illustrated starting position, the piston working space of the unit 14 is connected via a snifter bore 15 to a relatively unpressurized hydraulic reservoir 16. If the piston of the unit 14 is displaced to the left in FIG. 2, the snifter bore 15 is blocked off by the piston, that is to say the working space of the piston of the piston/cylinder unit 14 is blocked off with respect to the reservoir 16.

Figure 2:
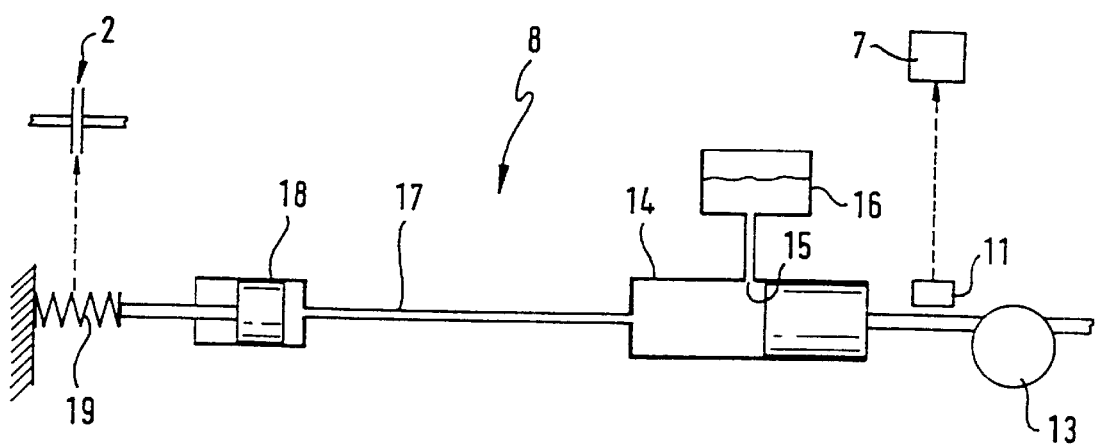
FIG. 2 shows a schematic illustration of an actuator unit with a hydraulic transmitter and receiver system for operating the clutch.

The piston/cylinder unit 14 is connected via a hydraulic line 17 to a further piston/cylinder unit 18, arranged as a hydraulic receiver, whose piston is capable of disengaging the clutch 2 (not specifically illustrated in FIG. 2) (cf. FIG. 1) when it is displaced to the left in FIG. 2 counter to the force of a spring system 19, which urges the clutch 2 into its engaged position and therefore urges the piston of the piston/cylinder unit 18 into the starting position illustrated in FIG. 2.

The system illustrated functions as follows:

If the clutch 2 is to be disengaged, the control unit 7 controls the actuating motor 13, so that the latter displaces the piston of the piston/cylinder unit 14 to the left from the starting position illustrated in FIG. 2. In the process, the snifter bore 15 is travelled over and blocked off, so that the piston/cylinder unit 18 is forcibly coupled hydraulically to the abovementioned unit 14, and the piston of the latter unit 18 executes a corresponding displacement to the left, the clutch 2 being disengaged. As long as this condition is maintained for only a short time, no noticeable temperature drift can result from any heating of the hydraulic column blocked in between the units 14 and 18.

If, however, the gearbox 4 in FIG. 1 is changed to idle and this condition is maintained for a relatively long time, according to the invention, the clutch 2 should also stay disengaged for a relatively long time, so that the pistons of the piston/cylinder units 14 and 18 have to maintain their position displaced to the left for a relatively long time. Heating of the hydraulic column between the units 14 and 18 then necessarily leads to a relative movement of the piston of the unit 18 in relation to the piston of the unit 14, even when the piston of the piston/cylinder unit 14 is stationary. This can lead to impaired control of the clutch 2 when the latter is subsequently to be engaged in a controlled manner by the piston, displaced to the left, of the piston/cylinder unit 14 being led back under control into the starting position of FIG. 2.

For this reason, the invention provides that, during idling operation, the clutch 2, although intrinsically kept disengaged, is engaged for a short time at predefined time intervals.

Since, in order to engage the clutch 2, the piston of the piston/cylinder unit 14 is led back into the starting position of FIG. 2 and, in so doing, opens the snifter bore 15, the spring system 19 is able to guide back the piston of the piston/cylinder unit 18 into the starting position of FIG. 2 in any case, since the two piston/cylinder units 14 and 18 are hydraulically decoupled because the snifter bore 15 is open. If the piston/cylinder unit 14 is subsequently operated again in order to open the clutch 2, blocking off the snifter bore 15, the piston of the piston/cylinder unit 18 initially has its predefined intended position in relation to the piston of the unit 14. Any subsequent temperature drift is then in turn reset by engaging the clutch 2 for a short time, that is to say by leading the piston of the unit 14 back into the starting position of FIG. 2.

This particular control of the clutch 2 during idling operation ensures that the input side 4' of the gearbox 4 is virtually permanently decoupled from the engine 1 in drive terms during idling. As a result, the risk of exciting noise—gearbox rattling—during idling is considerably reduced.

It is often the case that the engine 1 according to FIG. 1 also drives an air-conditioning system 20 or the like, it being possible for a particular risk of exciting noise to occur during idling of the gearbox 4 if the input side 4' of the gearbox is coupled to the engine 1 in drive terms by engaging the clutch 2 with the air-conditioning system 20 switched on.

Therefore, according to a particularly preferred embodiment of the invention, provision is made for the air-conditioning system 20 always to be automatically switched off temporarily when the gearbox 4 is changed to idle, if the clutch 2 is engaged temporarily in order to eliminate the temperature drift of the actuator unit 8. This action of switching off the air-conditioning system 20 temporarily can be carried out by the control unit 7.

Since the clutch 2 is engaged for a time of the order of magnitude of one to two seconds in each case in order to eliminate the temperature drift and is then disengaged again, the action of switching off the air-conditioning system can be carried out for a correspondingly short time interval, so that the operational interruption of the air-conditioning system 20 is not noticed at all by the occupants of the vehicle, but on the other hand the risk of exciting noise, which is particular noticeable and disturbing for the occupants of the vehicle, during idling phases is reduced considerably.

The control according to the invention of the air-conditioning system 20 can be performed by the control unit 7.

What is claimed is:

1. An air-conditioning control system in a motor vehicle having an engine and an automatic clutch, comprising:
    a gearbox which couples the engine to driving wheels of the vehicle, said gearbox being changeable arbitrarily by a driver between drive positions and idle and via the clutch arranged between the engine and the gearbox;
    a clutch actuator unit which operates the clutch and assumes a self-adjusting starting position when the clutch is engaged and assumes an operating position with temperature drift when the clutch is disengaged, said clutch being engaged for a short time at predefined intervals during idling in order to reset the temperature drift; and
    an air-conditioning system driven by the engine, said air-conditioning system being switched-off temporarily when, during idling, the clutch is engaged temporarily at predefined intervals in order to eliminate the temperature drift of the actuator unit.

2. The control system according to claim 1, wherein during idling, the clutch is engaged at intervals for a time on the order of magnitude of one to two seconds in each case.

3. The control system according to claim 1, wherein said actuator unit is a hydraulic transmitter and receiver system having displacer units on the transmitter and receiver side, a hydraulic column being blocked in between the transmitter and receiver when the transmitter is operated; and
    a relatively unpressurized hydraulic reservoir communicating with the hydraulic column when the transmitter is not operated.

4. The control system according to claim 2, wherein said actuator unit is a hydraulic transmitter and receiver system having displacer units on the transmitter and receiver side, a hydraulic column being blocked in between the transmitter and receiver when the transmitter is operated; and a relatively unpressurized hydraulic reservoir communicating with the hydraulic column when the transmitter is not operated.

5. The control system according to claim 1, further comprising a sensor arrangement associated with the actuator unit, said sensor arrangement registering a position of the actuator unit without the temperature drift.

6. The control system according to claim 2, further comprising a sensor arrangement associated with the actuator unit, said sensor arrangement registering a position of the actuator unit without the temperature drift.

7. The control system according to claim 3, further comprising a sensor arrangement associated with the actuator unit, said sensor arrangement registering a position of the actuator unit without the temperature drift.

8. The control system according to claim 1, further comprising a control unit operating to switch-off the air-conditioning system.

9. The control system according to claim 2, further comprising a control unit operating to switch-off the air-conditioning system.

10. The control system according to claim 3, further comprising a control unit operating to switch-off the air-conditioning system.

11. The control system according to claim 5, further comprising a control unit operating to switch-off the air-conditioning system.

12. A method for minimizing gearbox rattling noise in a motor vehicle equipped with an air-conditioning system, an engine and an automatic clutch, the method comprising the acts of:

engaging the clutch for a short time at predefined intervals during engine idling in order to reset a temperature drift occurring in an actuator unit of the clutch; and switching-off temporarily the air-conditioning system, driven by the engine, when, during said idling, the clutch is engaged temporarily.

13. A method for minimizing gearbox rattling during idling of a vehicle when a normally disengaged clutch is engaged for a short time period, the method comprising the act of:

detecting when the clutch is temporarily engaged during idling; and temporarily switching-off an air-conditioning system of the vehicle at least for a portion of the short time period when the clutch is engaged during idling.

\* \* \* \* \*